US012649815B2

(12) United States Patent
Mosciatti et al.

(10) Patent No.: US 12,649,815 B2
(45) Date of Patent: Jun. 9, 2026

(54) RIGID POLYURETHANE FOAM AND MULTILAYER THERMAL INSULATION ASSEMBLIES CONTAINING THE FOAM

(71) Applicant: Dow Global Technologies LLC, Midland, MI (US)

(72) Inventors: Thomas Mosciatti, Modena (IT); Cecelia Girotti, Correggio (IT); Carsten Berghaus, Herten (DE); Hans Kramer, Rapperswil-Jona (CH)

(73) Assignee: Dow Global Technologies LLC, Midland, MI (US)

( * ) Notice: Subject to any disclaimer, the term of this patent is extended or adjusted under 35 U.S.C. 154(b) by 762 days.

(21) Appl. No.: 18/021,435

(22) PCT Filed: Aug. 23, 2021

(86) PCT No.: PCT/US2021/047052
§ 371 (c)(1),
(2) Date: Feb. 15, 2023

(87) PCT Pub. No.: WO2022/046582
PCT Pub. Date: Mar. 3, 2022

(65) Prior Publication Data
US 2023/0312808 A1 Oct. 5, 2023

(30) Foreign Application Priority Data
Aug. 31, 2020 (IT) ........................ 102020000020662

(51) Int. Cl.
| | |
|---|---|
| *C08G 18/48* | (2006.01) |
| *C08G 18/08* | (2006.01) |
| *C08G 85/00* | (2006.01) |
| *C08J 9/04* | (2006.01) |
| C08G 101/00 | (2006.01) |

(52) U.S. Cl.
CPC ......... *C08G 18/4812* (2013.01); *C08G 18/14* (2013.01); *C08G 2101/00* (2013.01); *C08G 2110/0025* (2021.01); *C08G 2110/005* (2021.01); *C08G 2110/0083* (2021.01); *C08G 2330/00* (2013.01)

(58) Field of Classification Search
CPC ................ C08G 18/4812; C08G 18/14; C08G 2101/00; C08G 2110/0025; C08G 2110/005; C08G 2110/0083; C08G 2330/00; C08G 18/7664; C08G 2110/0033; C08G 18/092; C08G 18/3281; C08G 18/4816; C08G 18/482; C08G 18/5021; C08G 18/5033; C08G 18/6688; C08J 9/08; C08J 9/141
See application file for complete search history.

(56) References Cited

U.S. PATENT DOCUMENTS

| | | | |
|---|---|---|---|
| 5,470,891 A | 11/1995 | Green | |
| 5,484,817 A | 1/1996 | Patterson | |
| 5,488,071 A | 1/1996 | Patterson | |
| 5,684,057 A * | 11/1997 | White, III | C08G 18/482 |
| | | | 521/902 |
| 9,580,539 B2 | 2/2017 | Kramer | |
| 10,253,134 B2 | 4/2019 | Nefzger | |
| 2004/0162359 A1 | 8/2004 | Barber et al. | |
| 2016/0168348 A1 | 6/2016 | Golini et al. | |
| 2019/0152889 A1 | 5/2019 | Bi | |

FOREIGN PATENT DOCUMENTS

| | | | | |
|---|---|---|---|---|
| CN | 105330809 A * | 2/2016 | | C08K 5/521 |
| CN | 106008889 A | 10/2016 | | |
| CN | 106832188 A | 6/2017 | | |
| CN | 107903380 A | 4/2018 | | |
| EP | 3597685 A | 1/2020 | | |
| JP | 2013-224368 A | 10/2013 | | |
| JP | 2019-104788 A | 6/2019 | | |

* cited by examiner

*Primary Examiner* — K. B Boyle
(74) *Attorney, Agent, or Firm* — Warner Norcross + Judd LLP

(57) ABSTRACT

Rigid polyurethane foams are made using a mixture of polyols that includes 4 to 33% by weight of triisopropanolamine. The mixture of polyols is reacted with an aromatic polyisocyanate in the presence of a blowing agent, a foam-stabilizing surfactant and a urethane catalyst to produce the foam. The foams are useful as thermal insulation layers in multilayer thermal insulation assemblies such as appliance cabinets and walls for industrial and commercial freezers and refrigerators.

15 Claims, No Drawings

RIGID POLYURETHANE FOAM AND MULTILAYER THERMAL INSULATION ASSEMBLIES CONTAINING THE FOAM

This invention relates to rigid polyurethane foam, multilayer thermal insulation assemblies containing rigid polyurethane foam, and methods for making such foam and thermal insulation assemblies.

Multilayer thermal insulation assemblies are used as refrigerator and freezer cabinets, for walls and doors of walk-in refrigeration units, as coolers, and in other uses. The thermal insulation often is provided by a layer of rigid polyurethane foam that is adhered to a metal or plastic shell or liner on one or both sides. Refrigerator and freezer cabinets, for example, typically have an outer shell and an inner liner, with a polyurethane foam layer interposed between the two. These are manufactured by producing the foam layer in situ. A curable foam formulation is introduced into the region where the foam layer is wanted, where it expands and cures to produce the foam.

In appliance manufacturing specifically, the outer shell and inner liner are positioned in an apparatus, commonly called to a "jig", which holds them in the proper relative position with a defined cavity between them that is to be filled with the foam. The foam formulation is then introduced into the cavity through one or more injection ports. The foam formulation can contain or can produce upon mixing a gas that causes it to expand and fill the cavity. The expanded foam formulation cures in place to form a rigid insulating foam that adheres to both the shell and the liner.

The resulting cabinet assembly must be held in the jig until the foam formulation has cured enough that the foam is dimensionally stable. If removed from the jig ("demolded") prematurely, the foam will continue to expand, distorting the shell and/or liner and producing a defective product.

The time after which the unit can be demolded (the "demold time") plays a direct role in the productivity of the manufacturing equipment. Reducing the demold time permits the apparatus to be used more frequently, which increases production per unit time. Accomplishing this would have large economic benefits. A foam formulation that allows for shorter demolding times is therefore highly desirable.

The foam formulation must meet additional requirements as well. It must have low thermal conductivity. Modifications to a foam formulation that reduce demold times should have at most a small adverse effect on thermal conductivity, if any at all.

Another important characteristic of a foam formulation is its ability to completely fill a complex cavity. This characteristic is generally referred to as "flow index", or simply "flow". It is expressed as a ratio of the amount of foam formulation needed to fill a mold cavity to the amount needed to fill an equal volume under free-rise conditions. Optimally, this ratio is as close to one as possible. As a practical matter, this ratio is greater than one, typically 1.2 or higher, because it is more difficult for the foam formulation to fill a complex shape than to simply rise freely and because the foam formulation must rise against greater pressures in a closed mold than when it rises freely against the atmosphere. A greater amount of foam formulation is needed to fill a mold cavity when the flow index is higher. Raw material costs are increased proportionately. Improvements in demold times generally come at the expense of a significant increase in flow index, since the most straightforward way to decrease demold time is by increasing reactivity. A reduction in demold times without significantly affecting the flow index is therefore highly desirable.

Currently, foam formulations that exhibit an excellent combination of low demold time, low flow index and good thermal insulation capacity when cured can be produced using a form formulation that contains a polyether polyol initiated with ortho-toluenediamine. Global supplies of ortho-toluenediamine are inconsistent, and shortages and wide price fluctuations are common for this reason. Ortho-toluenediamine polyols are therefore expensive and difficult to handle given their high viscosity at room temperature. Foam that performs similarly or even better than foam based on ortho-toluenediamine polyols would be especially desirable.

Alkoxylated aliphatic amines such as propoxylates of ethylene diamine have been used in making rigid polyurethane foams. Their use is restricted due to their very high viscosities. Only small amounts of these materials can be tolerated in most instances.

JP 2013-224368A describes a rigid polyurethane foam made using a polyol mixture containing 10% by weight triisopropanolamine, 20 parts by weight of a toluene diamine-initiated polyol of unspecified equivalent weight and 70 parts of a sugar-initiated polyol, again of unspecified equivalent weight. These polyol mixtures have the drawbacks of being expensive and of having high viscosities. According to JP 2013-224368A, those high viscosities are necessary to prevent the foam formulation from leaking out of a cavity in which it is foamed.

CN 10533089 describes polyurethane foam formulations that contain TIPA. Those formulations are said to be useful for refrigerator spraying.

CN 106832188 describes containers made using a polyurethane foam formulation that contains TIPA.

CN 107903380 describes beer barrels made using a foam formulation that contains TIPA.

This invention is in one aspect a method of making a rigid polyurethane foam. The method comprises forming and curing a reaction mixture characterized by having an isocyanate index of 95 to 150 wherein the reaction mixture comprises A) an aromatic polyisocyanate or mixture of aromatic polyisocyanates, the aromatic polyisocyanate or mixture of aromatic polyisocyanates having an isocyanate functionality of 2 to 4 and an isocyanate equivalent weight of 80 to 175;

B) a mixture of polyols, the mixture of polyols having an average hydroxyl equivalent weight of 125 to 225 and an average hydroxyl functionality of 3.5 to 6 hydroxyl groups per molecule, wherein triisopropanolamine constitutes 4 to 33 weight percent of the mixture of polyols, at least one polyether polyol having 6 to 8, hydroxyl groups and a hydroxyl equivalent weight of 150 to 300 and which does not contain nitrogen atoms constitutes 30 to 90 weight percent of the mixture of polyols, and the mixture of polyols contains no more than 12 weight percent of alkoxylated aromatic amine-initiated polyols;

C) one or more blowing agents in an amount sufficient to produce a foam density of at most 42 $kg/m^3$ and D) at least one urethane catalyst and E) at least one foam-stabilizing surfactant.

The presence of triisopropanolamine (TIPA) in the foam formulation has been found to provide significant decreases in post expansion of the foam after demolding while introducing negligible changes to flow and thermal insulation capacity. When making appliances such as refrigerators and freezers, the decreased post expansion of the foam after demolding allows the demold times to be reduced during production and manufacturing equipment utilization to be increased by 10 to 20% or more. This effect is believed to be peculiar to TIPA; replacing TIPA with other low molecular weight aminoalcohols such as triethanolamine and non-amine molecules such as glycerin does not yield the desired effect.

In a particular aspect, the invention is a method of manufacturing a multilayer thermal insulation assembly, comprising 1) positioning an outer shell member and an inner shell member so as to define a cavity therebetween by holding the outer shell member and inner shell member in a mechanical apparatus that maintains them in a fixed position relative to each other;

2) introducing a polyurethane-forming reaction mixture characterized by an isocyanate index of 95 to 150 into the cavity;

3) curing the polyurethane-forming reaction mixture such that it expands and reacts to produce a polyurethane foam that fills the cavity and adheres to the outer shell member and to the inner shell member to produce the multilayer thermal insulation assembly, 4) and then demolding the multilayer thermal insulation assembly by removing it from the mechanical apparatus, wherein the reaction system comprises the polyurethane-forming reaction mixture comprising A) an aromatic polyisocyanate or mixture of aromatic polyisocyanates, the aromatic polyisocyanate or mixture of aromatic polyisocyanates having an isocyanate functionality of 2 to 4 and an isocyanate equivalent weight of 80 to 175;

B) a mixture of polyols, the mixture of polyols having an average hydroxyl equivalent weight of 125 to 225 and an average hydroxyl functionality of 3.5 to 6 hydroxyl groups per molecule, wherein triisopropanolamine constitutes 4 to 33 weight percent of the mixture of polyols, at least one polyether polyol having 6 to 8, hydroxyl groups and a hydroxyl equivalent weight of 150 to 300 and which does not contain nitrogen atoms constitutes 30 to 90 weight percent of the mixture of polyols, and the mixture of polyols contains no more than 12 weight percent of alkoxylated aromatic amine-initiated polyols; C) one or more blowing agents in an amount sufficient to produce a foam density of at most 42 kg/m³ and D) at least one urethane catalyst and E) at least one foam-stabilizing surfactant.

The invention is also a rigid polyurethane foam which is the reaction product of a polyurethane-forming reaction mixture characterized by an isocyanate index of 95 to 150, the polyurethane-forming reaction mixture comprising A) an aromatic polyisocyanate or mixture of aromatic polyisocyanates, the aromatic polyisocyanate or mixture of aromatic polyisocyanates having an isocyanate functionality of 2 to 4 and an isocyanate equivalent weight of 80 to 175;

B) a mixture of polyols, the mixture of polyols having an average hydroxyl equivalent weight of 125 to 225 and an average hydroxyl functionality of 3.5 to 6 hydroxyl groups per molecule, wherein triisopropanolamine constitutes 4 to 33 weight percent of the mixture of polyols, at least one polyether polyol having 6 to 8, hydroxyl groups and a hydroxyl equivalent weight of 150 to 300 and which does not contain nitrogen atoms constitutes 30 to 90 weight percent of the mixture of polyols, and the mixture of polyols contains no more than 12 weight percent of alkoxylated aromatic amine-initiated polyols;

C) one or more blowing agents in an amount sufficient to produce a foam density of at most 42 kg/m³ and D) at least one urethane catalyst and E) at least one foam-stabilizing surfactant.

The polyurethane-forming reaction mixture contains a mixture of polyols, one of which is triisopropanolamine (TIPA). TIPA constitutes 4 to 33% by weight of the mixture of polyols. The amount of TIPA is based on the weight of the polyols only, not on the weight of other ingredients as may be present in the polyurethane-forming reaction mixture. A preferred lower amount is at least 5 wt.-%, or 6 wt.-%. A preferred upper amount is up to 30 wt.-%, up to 25 wt.-%, up to 22 wt.-% or up to 20 wt.-%.

TIPA may be provided in the form of a neat or substantially neat material containing 95 to 100% TIPA by weight. A commercial grade containing 98-99.5% TIPA is suitable. Such highly concentrated grades of TIPA are room temperature solids, and may be melted if desired to be combined with the other components of the polyol blend. If desired, a mixture or solution of TIPA in a suitable solvent may be used. Such a mixture or solution may, for example, contain 80 to 94 wt.-% TIPA and correspondingly 6 to 20 wt.-% of another material, such as water, a polyol different than TIPA, or solvent that is not isocyanate reactive. Such mixtures or solutions, particularly those containing 80 to 94% TIPA and the balance water, have low viscosities and, unlike polyols based on aliphatic diamines such as ethylene diamine, can be incorporated into the reaction mixture without unduly increasing viscosity. Any polyol present in such a mixture or solution is counted toward the weight of the mixture of polyols but not the weight of the TIPA. TIPA itself has a molecular weight of about 191.3 g/mol and a hydroxyl functionality of 3.

The mixture of polyols contains at least one polyether polyol having 6 to 8 hydroxyl groups and a hydroxyl equivalent weight of 150 to 300, preferably 175 to 275 or 175 to 225, and which does not contain nitrogen atoms. Such a polyol or polyols may constitute at least 30 wt.-%, at least 40 wt.-% or at least 50 wt.-% of the mixture of polyols, and up to 95 wt.-%, up to 90 wt.-%, up to 80 wt.-% or up to 70 wt.-% thereof. Examples of such polyols include alkoxylates of sorbitol and/or sucrose, or other starter having 5 or more hydroxyl groups. The starter preferably is alkoxylated with 1,2-propylene oxide, ethylene oxide or both 1,2-propylene oxide and ethylene oxide, although other polymerizable oxiranes can be used to alkoxylate the starter.

The mixture of polyols has an average hydroxyl equivalent weight of 125 to 225 and an average hydroxyl functionality of 3.5 to 6 hydroxyl groups per molecule. The average hydroxyl equivalent weight may be at least 140 (hydroxyl number 400.7 mg KOH/g), at least 150 (hydroxyl number 374) or at least 160 (hydroxyl number 350.6) and may be, for example, up to 210 (hydroxyl number 267.1) or up to 200 (hydroxyl number 280.5). The hydroxyl equivalent weight of the mixture of polyols can be determined by measuring the hydroxyl number of the blend using well-known titration methods, or can be calculated from the equivalent weights and/or hydroxyl numbers of the individual polyols, and their amounts.

The mixture of polyols contains no more than 12 weight percent of alkoxylated aromatic amine polyols such as a toluenediamine-initiated polyol. The mixture of polyols may contain no more than 8 wt.-% thereof, no more 4 wt.-% thereof, or no more than 1 wt.-% and may contain no alkoxylated aromatic amine polyol at all.

The mixture of polyols in some embodiments contains no more than 5 wt.-%, preferably no more than 2 wt.-% of any alkoxylated aliphatic amine polyols (such as for example, triethanolamine or an ethylenediamine-initiated polyol) other than TIPA itself. The mixture of polyols may contain no other alkoxylated aliphatic amine polyols at all.

The mixture of polyols in some embodiments contains no more than 5 wt.-%, preferably no more than 2 wt.-% of any alkoxylated amine polyols (whether the amine is an aromatic amine or an aliphatic amine) other than TIPA itself. The mixture of polyols may contain no more than 1 wt.-%, no more than 0.5 wt.-% or no more than 0.25 wt.-% of another alkoxylated amine, and may contain no other alkoxylated amines.

The other polyol or polyols in the mixture of polyols (apart from TIPA) may have hydroxyl equivalent weights of 31 to 3000 or more, and hydroxyl functionalities of 2 to 12 or more, provided the mixture of polyols (including TIPA) has average hydroxyl equivalent weight and functionality as described before.

The mixture of polyols in some embodiments contains no more than 10 wt.-%, no more than 5 wt.-%, no more than 2 wt.-% or no more than 1 wt.-% of polyols having a hydroxyl equivalent weight of less than 70, other than TIPA. The mixture of polyols may be devoid of such polyols.

The mixture of polyols in some embodiments contains at least one polyether polyol having 2 to 3 hydroxyl groups and a hydroxyl equivalent weight of 300 to 750, and which does not contain nitrogen atoms. Such a polyol or polyols may, for example, constitute at least 1 wt.-%, at least 3 wt.-% or at least 5 wt.-% of the mixture of polyols, and up to 50 wt.-%, up to 35 wt.-%, or up to 20 wt.-% thereof. Examples of such polyols include alkoxylates of di- and trifunctional starters such as ethylene glycol, diethylene glycol, triethylene glycol, propylene glycol, dipropylene glycol, tripropylene glycol, glycerin, trimethylolpropane, trimethylolethane, and the like. The starter preferably is alkoxylated with 1,2-propylene oxide, ethylene oxide or both 1,2-propylene oxide and ethylene oxide, although other polymerizable oxiranes can be used.

The mixture of polyols may further contain one or more polyether polyols that do not contain nitrogen atoms, different from those mentioned above, provided the mixture of polyols has an average functionality and hydroxyl equivalent weight as set forth above. In addition, the mixture of polyols may contain other polyols such as polyester polyols, polyacrylate polyols and the like, again provided the mixture of polyols has an average functionality and hydroxyl equivalent weight as set forth above. Any and all of these other polyols may be absent.

The aromatic polyisocyanate compound(s) are compounds that contain two or more aromatically-bound isocyanate groups per molecule. A preferred isocyanate is methane diphenyldiisocyanate (MDI) and a still more preferred isocyanate compound is a polymeric MDI. By "polymeric MDI", it is meant a mixture of MDI with polymethylene polyphenylisocyanates that contain at least three phenylisocyanate groups. The MDI may be either the 2,4'- or the 4,4'-isomer, or a mixture of both. The MDI or polymeric MDI may be modified with carbodiimide, uretonimine, urethane or biuret linkages.

The aromatic polyisocyanate compounds preferably have an isocyanate equivalent weight of 125 to 168 and an average isocyanate functionality of 2.2 to 4.0. An example of a useful polyisocyanate is a polymeric MDI having an isocyanate equivalent weight of about 130 to 168, especially 130 to 150, and an isocyanate functionality from 2.2 to about 3.5, especially 2.5 to 3.0.

The polyisocyanate is provided to the polyurethane-forming reaction mixture to provide an isocyanate index of 95 to 150. In some embodiments the isocyanate index is at least 100 or at least 102 and up to 125, up to 115 or up to 110. Isocyanate index is 100 times the ratio of equivalents isocyanate groups to equivalents of isocyanate-reactive groups provided to the polyurethane-forming reaction mixture.

The polyurethane-forming reaction mixture includes at least one urethane catalyst, i.e., a catalyst for the reaction of an isocyanate group with a hydroxyl group and/or for the reaction of water with an isocyanate group. Examples of urethane catalysts include, for example, tertiary amine compounds, cyclic amidines and various metal carboxylate compounds, especially tin carboxylates and tetravalent tin compounds. Amine catalysts preferably have zero or at most one hydroxyl group.

The choice of catalyst and amount of catalyst may be selected to provide the polyurethane-forming reaction mixture with desired curing characteristics. The amount and type of catalyst(s) may be selected such that the reaction mixture exhibits a cream time of 2 to 8 seconds, preferably 3 to 6 seconds; a gel time of 30 to 60 seconds, preferably 35 to 50 seconds, and a tack-free time of 50 to 90 seconds, preferably 60 to 80 seconds, all measured as described in the following examples.

Representative amine catalysts include trimethylamine, triethylamine, dimethylethylamine, N-methylmorpholine, N-ethylmorpholine, N,N-dimethylbenzylamine, N,N-dimethylethanolamine, N,N,N',N'-tetramethyl-1,4-butanediamine, N,N,N',N'',N''-pentamethyldiethylenetriamine, N,N-dimethylpiperazine, 1,4-diazobicyclo-2,2,2-octane, bis (dimethylaminoethyl)ether, bis(2-dimethylaminoethyl) ether, morpholine,4,4'-(oxydi-2,1-ethanediyl)bis, triethylenediamine, pentamethyl diethylene triamine, N,N-dimethylcyclohexylamine, N-cetyl N,N-dimethyl amine, N-coco-morpholine, N,N-dimethyl aminomethyl N-methyl ethanol amine, N, N, N'-trimethyl-N'-hydroxyethyl bis(aminoethyl) ether, N,N-bis(3-dimethylaminopropyl)N-isopropanolamine, (N,N-dimethyl) amino-ethoxy ethanol, N, N, N', N'-tetramethyl hexane diamine, 1,8-diazabicyclo-5,4,0-undecene-7, 2,4,6-tris(dimethylaminomethyl)phenol, N,N-dimorpholinodiethyl ether, N-methyl imidazole, dimethyl aminopropyl dipropanolamine, bis(dimethylaminopropyl) amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine and methyl-hydroxyethyl piperazine.

Examples of useful tin catalysts include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctyl-mercaptoacetate, and the like.

Examples of isocyanate trimerization catalysts include strong bases such as alkali metal phenolates, alkali metal alkoxides, alkali metal carboxylates, quaternary ammonium salts, various triazine compounds and the like. Examples of such trimerization catalysts include sodium p-nonylphenolate, sodium p-octyl phenolate, sodium p-tert-butyl phenolate, sodium acetate, sodium 2-ethylhexanoate, sodium propionate, sodium butyrate, the potassium analogs of any of the foregoing, trimethyl-2-hydroxypropylammonium carboxylate salts, 1,3,5-tris[(3-dimethylamino)propyl]hexahydro-1,3,5-triazine, 2,4,6-tris(dimethylaminomethyl) phenol, and the like. Some isocyanate trimerization catalysts also function as urethane catalysts and can perform both roles.

Catalysts are typically used in small amounts. For example, the total amount of catalyst used may be 0.0015 to 3.9, preferably from 0.01 to 2, parts by weight per 100 parts by weight of the mixture of polyols. Metallic catalysts are generally used in amounts of less than 0.5 parts by weight of the mixture of polyols.

The polyurethane-forming reaction mixture contains a blowing agent. Water is a preferred blowing agent, although other chemical (exothermic) and/or physical (endothermic) blowing agents may be used instead of or in addition to water. Among the useful physical blowing agents are compounds having boiling temperatures from to 50° C., including hydrocarbons, hydrofluorocarbons and hydrofluorochlorcarbons as well as diethyl ether. Those having low or zero global warming potential and low or zero ozone depletion potential are preferred. Water as a sole blowing agent may be used in an amount of 1 to 5 parts by weight, preferably 2 to 4 parts by weight, per 100 parts by weight of the mixture of polyols. A preferred physical blowing agent is a $C_4$-$C_6$ hydrocarbon or mixture of such hydrocarbons, such as cyclopentane or mixtures of $C_4$-$C_6$ hydrocarbons containing 50% or more cyclopentane by weight. An especially preferred blowing agent is a combination of water and a $C_4$-$C_6$ hydrocarbon or mixture of such hydrocarbons, especially a combination of water and cyclopentane.

Blowing agents are used in amounts such that the polyurethane foam has a density of up to 42 kg/m³, preferably up to 40 kg/m³ or up to 36 kg/m³. In particular embodiments, the density of the polyurethane foam may be at least 20 kg/m³ or at least 24 kg/m³.

A foam-stabilizing surfactant is present in the polyurethane-forming reaction mixture. A wide variety of silicone surfactants as are commonly used in making polyurethane foams can be used in making the foams with the polymer polyols or dispersions of this invention. Examples of such silicone surfactants are commercially available under the tradenames Tegostab™ (Evonik), Niax™ Momentive Performance Products), Vorasurf™ (Dow Chemical) and Dabco™ (Evonik). Various other non-silicone anionic, cationic, zwitterionic and non-ionic surfactants are also useful. Examples of useful non-ionic surfactants include block copolymers of ethylene oxide and a higher alkylene oxide such as 1,2-propylene oxide and 1,2-butylene oxide. Such block copolymers may contain, for example, 40 to 90% by weight oxyethylene units and have molecular weights of 1500 to 12,000. Such block copolymers may have one or more hydroxyl groups. Examples of suitable block copolymers include those sold by The Dow Chemical Company under the Tergitol™ trade name, and those sold by BASF under the Pluronics™ trade name.

Surfactants, if used, typically are present in amounts such as from 0.25 to 2.5 parts by weight per 100 parts by weight of the mixture of polyols.

The reaction mixture may contain various optional ingredients. Examples of such optional ingredients include combustion modifiers such as melamine, phosphorous compounds with or without halogens such as tris(1-chloro-2-propyl)phosphate, aluminum containing compounds with or without halogens, nitrogen based compounds with or without halogens, chlorinated compounds, brominated compounds, expandable graphite, boron derivatives, and polyureas; particulate filler and/or fibers; colorants; antioxidants; antimicrobials and/or other biocides; preservatives; and the like.

The foam is prepared by bringing the various components together to form a reaction mixture and curing the reaction mixture under conditions such that the polyol(s) and isocyanate(s) react, the blowing agent reacts (if chemical) or volatilizes (if physical) to generate a gas, and the reaction mixture expands and cures. All components (or any subcombination thereof) except the polyisocyanate can be pre-blended into a formulated polyol composition, if desired, which is then mixed with the polyisocyanate when the foam is to be prepared.

An advantage of this invention is that the mixture of polyols and fully formulated polyol composition containing the mixture of polyols, the blowing agents, catalysts and surfactant(s) typically has a somewhat low viscosity due to the low viscosity of TIPA itself (after being blended into the remaining ingredients). Such a fully formulated polyol composition may exhibit, for example, a dynamic viscosity of 300 to 1500, especially 500 to 800 MPa-s at 25° C. as measured according to ASTM D4878-15.

The components may be preheated if desired, but this is usually not necessary, and the components can be brought together at about room temperature (~22° C.) to conduct the reaction. It is usually not necessary to apply heat to the composition to drive the cure, but this may be done if desired, too.

The invention is particularly useful in so-called "pour-in-place" applications, in which the reaction mixture is dispensed into a cavity and foams within the cavity to fill it and provide structural and/or thermal insulation attributes to an assembly. The nomenclature "pour-in-place" refers to the fact that the foam is created at the location where it is needed in the assembly, rather than being created in one step and later assembled into place in a separate manufacturing step. Pour-in-place processes are commonly used to make appliance products such as refrigerators, freezers, coolers and similar products, which have walls that contain thermal insulation foam.

The walls of appliances such as refrigerators, freezers and coolers are most conveniently insulated in accordance with the invention by first assembling an outer shell and an interior liner together such that a cavity is formed between the shell and liner. The cavity defines the space to be insulated as well as the dimensions and shape of the foam that is produced. Typically, the shell and liner are bonded together in some way, such as by welding, melt-bonding or through use of some adhesive (or some combination of these) prior to introduction of the foam formulation. The shell and liner may be supported or held in the correct relative positions using a jig or other mechanical apparatus. One or more inlets to the cavity are provided through which the foam formulation can be introduced. Usually, one or more outlets are provided to allow air in the cavity to escape as the cavity is filled with the foam formulation and the foam formulation expands.

The materials of construction of the shell and liner are not particularly critical, provided that they can withstand the conditions of the curing and expansion reactions of the foam formulation. In most cases, the materials of construction will be selected with regard to specific performance attributes that are desired in the final product. Metals such as steel are commonly used as the shell, particularly in larger appliances such as freezers or refrigerators. Plastics such as polycarbonates, polypropylene, polyethylene styrene-acrylonitrile resins, acrylonitrile-butadiene-styrene resins or high-impact polystyrene are used more often to make shells for smaller appliances (such as coolers) or those in which low weight is important. The liner may be a metal, but is more typically a plastic as just described.

The reaction mixture is then introduced into the cavity. The various components of the reaction mixture are combined and the mixture introduced quickly into the cavity, where the reaction mixture reacts and expands. It is common to pre-mix the polyol(s) together with the water and blowing agent (and often catalyst and/or surfactant as well) to produce a formulated polyol. The formulated polyol can be stored until it is time to prepare the foam, at which time it is mixed with the polyisocyanate and introduced into the cavity. It is usually not required to heat the components prior to introducing them into the cavity, nor it is usually required to heat the reaction mixture within the cavity to drive the cure, although either or both of these steps may be taken if desired. The shell and liner may act as a heat sink in some cases and remove heat from the reaction mixture. If necessary, the shell and/or liner can be heated somewhat (such as up to 50° C. and more typically 35-40° C.) to reduce this heat sink effect or to drive the cure.

Enough of the reaction mixture is introduced such that, after it has expanded, the resulting foam fills those portions of the cavity where foam is desired. Most typically, essentially the entire cavity is filled with foam. It is generally preferred to "overpack" the cavity slightly, by introducing more of the reaction mixture than is minimally needed to fill the cavity, thereby increasing the foam density slightly. The overpacking provides benefits such as better dimensional stability of the foam, especially in the period following demold. Generally, the cavity is overpacked by 4 to 25% by weight. The final foam density for most appliance applications is preferably in the range of 24 to 42 kg/m³, especially 24 to 36 kg/m³.

After the foam formulation has expanded and cured enough to be dimensionally stable, the resulting assembly can be "demolded" by removing it from the jig or other support that is used to maintain the shell and liner in their correct relative positions. Short demold times are important to the appliance industry, as shorter demold times allow more parts to be made per unit time on a given piece of manufacturing equipment. A significant advantage of this invention is that demold times are short. Demold times can be evaluated as described in the following examples. Demold time may be, for example, from 3.5 to 20 minutes depending on the shape and complexity of the final product. For domestic appliance cabinets such as refrigerator or freezer cabinets for home use, for example, a preferred demold time is 2.5 to 6 minutes or 3 to 5 minutes. When making very large multilayer thermal insulation assemblies such as walls for commercial refrigeration units, a preferred demold time may be 6 to 20 minutes or 8 to 12 minutes.

As mentioned, flow is another important attribute of the foam formulation, which can be determined as set forth in the following examples. With this invention, flow index values are typically 1.10 to 1.5, especially 1.15 to 1.5.

The polyurethane foam advantageously exhibits a low thermal conductivity or k-factor. The k-factor of a foam may depend on several variables, of which density is an important one. For many applications, a rigid polyurethane foam having a density of 28 to 42 kg/m³ exhibits a good combination of physical properties, dimensional stability, and cost. Foam in accordance with the invention, having a density within that range, preferably exhibits a 10° C. k-factor of no greater than 23, preferably no greater than 22 mW/m-° K, as measured according to EN 12667. Higher density foam may exhibit a somewhat higher k-factor.

In addition to the appliance and thermal insulation foams described above, the invention is also useful to produce vehicle noise dampening foams, one or more layers of a laminated board, pipe insulation and other foam products. The invention is of special interest when a rapid cure is wanted, and/or good thermal insulating properties are wanted in the foam.

If desired, the process of the invention can be practiced in conjunction with the methods described, for example, in WO 07/058793, in which the reaction mixture is injected into a closed mold cavity that is at a reduced pressure.

The following examples are provided to illustrate the invention but are not intended to limit the scope thereof. All parts and percentages are by weight unless otherwise indicated.

Polyol A is a propoxylated sorbitol. It has a hydroxyl functionality of 6 and a hydroxyl number of 477 mg KOH/g (equivalent weight 117).

Polyol B is a propoxylated glycerin. It has a hydroxyl functionality of 3 and a hydroxyl number of 156 mg KOH/g (equivalent weight 360).

Polyol C is a propoxylated ethylene diamine. It has a hydroxyl functionality of 4 and a hydroxyl number of 500 mg KOH/g (equivalent weight 112).

Polyol D is a propoxylate of a mixture of glycerin and sucrose. It has an average hydroxyl functionality of 4.7 and a hydroxyl number of 360 mg KOH/g (equivalent weight 156).

Polyol E is a propoxylated ethylene diamine. It has a hydroxyl functionality of 4 and a hydroxyl number of 640 mg KOH/g (equivalent weight 88).

Polyol F is a propoxylated o-toluene diamine. It has a hydroxyl functionality of 4 and a hydroxyl number of 440 mg KOH/g (equivalent weight 128).

Polyol G is a propoxylated propylene glycol. It has a hydroxyl functionality of 2 and a hydroxyl number of 110 mg KOH/g (equivalent weight 510).

TIPA is triisopropanolamine, provided as a 90% solution in water. In the following tables, the indicated weight of the water includes that of the water introduced with this TIPA. The weight of the TIPA is indicated as that of the neat material.

Catalyst A is an N,N,N',N',N'-pentamethyldiethylenetriamine urethane catalyst.

Catalyst B is a potassium acetate isocyanate trimerization catalyst.

Catalyst C is a 2,4,6-tris(dimethylaminomethyl)phenol urethane and isocyanate trimerization catalyst.

Catalyst D is an N,N-benzyldimethylamine urethane catalyst.

Catalyst E is a 1,3,5-tris[(3-dimethylamino)propyl]hexahydro-1,3,5-triazine urethane and isocyanate trimerization catalyst.

Catalyst F is an N,N-dimethylcyclohexylamine urethane catalyst.

The Polymeric MDI has an isocyanate functionality of 2.7 and an isocyanate content of 31% by weight.

EXAMPLES 1-2 AND COMPARATIVE SAMPLE A

Rigid polyurethane foams are made using the ingredients as indicated in Table 1. All ingredients except the Polymeric MDI are premixed to form a formulated polyol. The viscosity of the formulated polyol is measured at 25° C. according to ASTM D4878-15. The formulated polyol and the Polymeric MDI are separately brought to 22-24° C. and processed using an Afros Canon A40 high pressure injection machine equipped with an L-shaped head at a mixing pressure of 150 bars and an output of 200 g/s. The resulting foam formulation is dispensed into a vertically-oriented, 20-liter (200 cm×20 cm×5 cm) "Brett" mold heated at 35 C° and coated with release agent for evaluation of minimum fill density and post-demold expansion after various curing times. Foam is dispensed into a 30 cm×20 cm×20 cm box lined with a polyethylene film for measurement of free rise density.

Minimum fill density is determined by injecting various amounts of the foam formulation into the Brett mold to determine the minimum amount of foam formulation needed to produce a foam that fills the mold. The minimum fill density is the density of the resulting foam. Flow Index is calculated as the ratio of minimum fill density to free rise density.

Post-demold expansion is determined at various demold times by producing foams in a 70 cm×40 cm×10 cm "Jumbo Brett" mold. The foams are removed from the mold after a predetermined curing time and measuring its thickness. After a further 24 hours, the foam thickness is re-measured. The difference between the thickness after 24 hours and the initial thickness is an indication of the post-demold expansion of the foam.

Thermal conductivity is measured on 20 cm×20 cm×2.5 cm core specimens taken from the Brett molded foams according to EN 12667 using a Lasercomp Fox 200 heat flow meter. Average plate temperature is 10° C.

Cream, gel and tack free times are measured by combining the Polymeric MDI and formulated polyol in the high pressure machine and dispensing the resulting reaction mixture into a plastic bag Cream time is the time after pouring at which a visible reaction is observed. A spatula is pressed to the surface of the curing reaction mixture and removed to evaluate for gel time (the time after mixing at which strings of polymer stick to the spatula) and tack-free time (the time after mixing at which the polymer no longer sticks to the spatula).

Results of the various testing are as indicated in Table 2.

TABLE 1

|  | Parts By Weight (Index) | | |
| --- | --- | --- | --- |
| Ingredient | Comp. A* | Ex. 1 | Ex. 2 |
| Polyol A | 62.8 | 62.8 | 62.8 |
| Polyol B | 25.0 | 25.0 | 13.0 |
| Polyol C | 5.0 | 0 | 5.0 |
| TIPA | 0 | 5.0 | 12.0 |
| Surfactant | 2.5 | 2.5 | 2.5 |
| Catalyst A | 1.3 | 1.0 | 0.85 |
| Catalyst B | 0.2 | 0.2 | 0.2 |
| Catalyst C | 0.7 | 0.7 | 0.7 |
| Water | 2.5 | 2.5 | 2.5 |
| Cyclopentane | 14.5 | 14.5 | 14.5 |
| Polymeric MDI | 145 | 148 | 147 |
|  | (1.14) | (1.14) | (1.14) |

*Comparative.

TABLE 2

| Sample | Comp. A* | Ex. 1 | Ex. 2 |
| --- | --- | --- | --- |
| Formulated polyol viscosity, MPa · s, 25° C. | 677 | 668 | 674 |
| Cream time, s | 3 | 4 | 6 |
| Gel Time, s | 40 | 48 | 46 |
| Tack Free Time, s | 65 | 70 | 70 |
| Free Rise Density, kg/m$^3$ | 22.4 | 21.3 | 22.2 |
| Minimum Fill Density kg/m$^3$ | 30.2 | 27.9 | 29.4 |
| Flow Index | 1.35 | 1.31 | 1.32 |
| Thermal Conductivity, mW/m-K | 20.2 | 20.1 | 20.1 |
| Post-Demold Expansion, 4 minute cure, % | 9.6 | 6.5 | 7.7 |
| Post-Demold Expansion, 5 minute cure, % | 7.0 | 4.7 | 5.7 |
| Post-Demold Expansion, 6 minute cure, % | 6.2 | 4.1 | 2.9 |

*Comparative.

Examples 1 and 2 demonstrate the effect of replacing all of another amine-initiated polyol (Polyol C) or a portion of a non-amine-initiated polyol (Polyol B) with TIPA. A small reduction in the amount of the urethane catalyst (Catalyst A) is made in each case to compensate for the expected catalytic activity of TIPA. As the data in Table 2 shows, cream, gel and tack-free times show little change when TIPA replaces a portion of the other polyols, even with the reduction in urethane catalyst. Thermal conductivity is improved slightly.

A large decrease in post-demold expansion is seen in the formulations that contain TIPA. The inventive foams exhibit less expansion after a 5-minute cure than the control does after curing for 6 minutes. Example 1 exhibits less post-demold expansion after a 4-minute cure than the control does after curing for 6 minutes. These results indicate that the demold time can be reduced from 6 minutes to 5 minutes or even less by incorporating TIPA into the foam formulation. This amounts to an increase in equipment utilization of about 15% or more, without loss of other desirable properties.

EXAMPLE 3 AND COMPARATIVE SAMPLES B-E

Polyurethane foams are made in the same general manner as in the previous example. Ingredients are as indicated in Table 3. The resulting foams are evaluated for cream, gel and tack free times, minimum foam density, and post-demold expansion after various cure times. Results are as indicated in Table 4.

TABLE 3

|  | Parts By Weight (Index) | | | | |
| --- | --- | --- | --- | --- | --- |
| Ingredient | Comp. B* | Comp. C* | Ex. 3 | Comp. D* | Comp. E* |
| Polyol A | 62.8 | 62.8 | 62.8 | 62.8 | 62.8 |
| Polyol B | 25.0 | 25.0 | 25.0 | 25.0 | 25.0 |
| Polyol C | 5.0 | 2.5 | 0 | 0 | 0 |
| TIPA | 0 | 2.5 | 5.0 | 0 | 0 |
| Triethanolamine | 0 | 0 | 0 | 5 | 0 |
| Glycerin | 0 | 0 | 0 | 0 | 5 |
| Surfactant | 2.5 | 2.5 | 2.5 | 2.5 | 2.5 |
| Catalyst A | 1.3 | 1.3 | 1.3 | 1.15 | 1.3 |
| Catalyst B | 0.2 | 0.2 | 0.2 | 0.2 | 0.2 |
| Catalyst C | 0.7 | 0.7 | 0.7 | 0.7 | 0.7 |
| Water | 2.5 | 2.5 | 2.5 | 2.5 | 2.5 |

TABLE 3-continued

| | Parts By Weight (Index) | | | | |
|---|---|---|---|---|---|
| Ingredient | Comp. B* | Comp. C* | Ex. 3 | Comp. D* | Comp. E* |
| Cyclopentane | 14.5 | 14.5 | 14.5 | 14.5 | 14.5 |
| Polymeric MDI | 145 | 147 | 147 | 154 | 163 |
| | (1.14) | (1.14) | (1.14) | (1.13) | (1.14) |

*Comparative.

TABLE 4

| Sample | Comp. B* | Comp. C* | Ex. 3 | Comp. D* | Comp. E* |
|---|---|---|---|---|---|
| Cream time, s | 4 | 3 | 3 | 5 | 2 |
| Gel Time, s | 45 | 43 | 40 | 39 | 37 |
| Tack Free Time, s | 56 | 62 | 80 | 76 | 74 |
| Minimum Fill Density, kg/m$^3$ | 30.2 | 30.2 | 29.1 | 30.4 | 30.4 |
| Post-Demold Expansion, 4 minute cure, % | 6.9 | 6.4 | 5.1 | 6.5 | 7.2 |
| Post-Demold Expansion, 5 minute cure, % | 4.9 | 5.1 | 2.8 | 5.3 | 5.1 |
| Post-Demold Expansion, 6 minute cure, % | 3.3 | 4.2 | 2.6 | 4.5 | 4.5 |

*Comparative.

Replacing 2.5 parts of Polyol C with TIPA provides no reduction in post demold expansion at the 4-minute and 5-minute cure times. By contrast, increasing the amount of TIPA to 5 parts as in Example 3 leads to very large reductions in post-demold expansion at all demold times under evaluation. As before, the post demold expansion of Ex. 3 after 5 minutes curing is less than that of the control (and the sample with only 2.5 parts TIPA) after 6 minutes curing. A 15% or greater increase in equipment utilization is possible.

Comparative Samples D and E show the effect of replacing Polyol C with triethanolamine and glycerin, respectively. Neither of these materials provides any benefit in post-demold expansion.

EXAMPLES 4 AND 5 AND COMPARATIVE SAMPLE F

Rigid polyurethane foams are made and evaluated as described in the earlier examples. The ingredients of the foam formulation are as indicated in Table 5. Results of testing are as indicated in Table 6.

TABLE 5

| | Parts By Weight (Index) | | |
|---|---|---|---|
| Ingredient | Comp. F* | Ex. 4 | Ex. 5 |
| Polyol A | 45.0 | 50.0 | 50.0 |
| Polyol B | 20.0 | 14.0 | 18.0 |
| Polyol D | 22.8 | 19.8 | 15.8 |
| Polyol E | 4 | 0 | 0 |
| TIPA | 0 | 8 | 8 |
| Surfactant | 3.0 | 3.0 | 3.0 |
| Catalyst A | 0.45 | 0.45 | 0.44 |
| Catalyst B | 0.2 | 0.2 | 0.2 |
| Catalyst D | 1.04 | 1.04 | 1.04 |
| Catalyst E | 0.41 | 0.41 | 0.41 |
| Catalyst F | 0.8 | 0.8 | 0.8 |
| Water | 2.3 | 2.3 | 2.3 |

TABLE 5-continued

| | Parts By Weight (Index) | | |
|---|---|---|---|
| Ingredient | Comp. F* | Ex. 4 | Ex. 5 |
| Cyclopentane | 14.7 | 14.7 | 14.7 |
| Polymeric MDI | 147 | 156 | 156 |
| | (1.21) | (1.20) | (1.20) |

*Comparative.

TABLE 6

| Sample | Comp. F* | Ex. 4 | Ex. 5 |
|---|---|---|---|
| Cream time, s | 5 | 5 | 6 |
| Gel Time, s | 49 | 51 | 51 |
| Tack Free Time, s | 97 | 94 | 94 |
| Free Rise Density, kg/m$^3$ | 23.7 | 24.0 | 24.4 |
| Minimum Fill Density kg/m$^3$ | 33.5 | 33.9 | 33.9 |
| Flow Index | 1.45 | 1.47 | 1.44 |
| Thermal Conductivity, mW/m-K | 19.6 | 19.6 | 19.6 |
| Post-Demold Expansion, 4 minute cure, % | 2.8 | 1.9 | 2.1 |
| Post-Demold Expansion, 6 minute cure, % | 0.41 | 0.16 | 0.25 |
| Post-Demold Expansion, 7 minute cure, % | 0.19 | 0.00 | 0.00 |

Adding TIPA into this foam formulation has no significant effect on cream time, gel time, tack-free time, free rise density, minimum fill density, flow index or thermal conductivity. However, the foams made using TIPA exhibit substantially less post-demold expansion at the shorter cure times.

The low viscosity of TIPA allows the amount of the higher-viscosity sorbitol-initiated polyol to be increased. This allows the average functionality of the system to be increased, which further contributes to the shorter demold times and reduced post-demold expansion due to the greater crosslink density of the system.

EXAMPLES 6 AND 7 AND COMPARATIVE SAMPLE G

Rigid polyurethane foams are made and evaluated as described in the earlier examples. The ingredients of the foam formulation are as indicated in Table 7. Results of testing are as indicated in Table 8.

TABLE 7

| | Parts By Weight | | |
|---|---|---|---|
| Ingredient | Comp. G* | Ex. 6 | Ex. 7 |
| Polyol A | 60 | 60 | 60 |
| Polyol F | 16 | 12 | 8 |
| Polyol G | 6.1 | 6.1 | 6.1 |
| Polyol B | 10 | 10 | 10 |
| TIPA | 0 | 4.0 | 8.0 |
| Surfactant | 2.8 | 2.8 | 2.8 |
| Catalyst A | 0.7 | 0.7 | 0.7 |
| Catalyst F | 1.2 | 1.2 | 1.2 |
| Catalyst C | 0.6 | 0.6 | 0.6 |
| Catalyst B | 0.1 | 0.1 | 0.1 |
| Water | 2.5 | 2.5 | 2.5 |
| Cyclopentane | 14.0 | 14.0 | 14 |
| Polymeric MDI | 150 | 154 | 155 |

*Comparative

15

TABLE 8

| Sample | Comp. G* | Ex. 6 | Ex. 7 |
|---|---|---|---|
| Cream time, s | 4 | 4 | 4 |
| Gel Time, s | 39 | 43 | 44 |
| Tack Free Time, s | 75 | 76 | 85 |
| Free Rise Density, kg/m³ | 24.3 | 24.0 | 24.6 |
| Minimum Fill Density kg/m³ | 32.2 | 31.9 | 32.2 |
| Flow Index | 1.32 | 1.33 | 1.31 |
| Thermal Conductivity, mW/m-K | 19.5 | 19.5 | 19.5 |
| Post-Demold Expansion, 4 minute cure, % | 6.9 | 5.2 | 6.2 |
| Post-Demold Expansion, 5 minute cure, % | 5.4 | 4.5 | 4.2 |
| Post-Demold Expansion, 6 minute cure, % | 4.5 | 3.7 | 3.9 |

*Comparative

The data in Table shows the benefit of replacing a portion of an o-toluenediamine-initiated polyol with TIPA. Comparative Sample G is representative of very high quality thermal insulation foam characterized by excellent thermal conductivity and flow index, and which is already formulated for short demold times. TIPA is a drop-in replacement for the o-toluenediamine-initiated polyol on a weight-for-weight basis. Replacing the o-toluenediamine-initiated polyol with TIPA has no significant effect on cream, gel and tack-free times, free rise and minimum fill densities, flow index or thermal conductivity. Post-demold expansion is reduced at all cure times, although this effect is less pronounced in these formulations than in the previous examples, due to the already excellent performance of Comparative Sample G.

The invention claimed is:

1. A rigid polyurethane foam which is the reaction product of a polyurethane-forming reaction mixture characterized by an isocyanate index of 95 to 150, the polyurethane-forming reaction mixture comprising
   A) an aromatic polyisocyanate or mixture of aromatic polyisocyanates, the aromatic polyisocyanate or mixture of aromatic polyisocyanates having an isocyanate functionality of 2 to 4 and an isocyanate equivalent weight of 80 to 175;
   B) a mixture of polyols, the mixture of polyols having an average hydroxyl equivalent weight of 125 to 225 and an average hydroxyl functionality of 3.5 to 6 hydroxyl groups per molecule, wherein triisopropanolamine constitutes 4 to 33 weight percent of the mixture of polyols, at least one polyether polyol having 6 to 8 hydroxyl groups and a hydroxyl equivalent weight of 150 to 300 and which does not contain nitrogen atoms constitutes 30 to 90 weight percent of the mixture of polyols, and the mixture of polyols contains no more than 12 weight percent of alkoxylated aromatic amine-initiated polyols;
   C) one or more blowing agents in an amount sufficient to produce a foam density of at most 42 kg/m³ and
   D) at least one urethane catalyst and
   E) at least one foam-stabilizing surfactant.

2. The rigid polyurethane foam of claim 1, wherein alkoxylated aromatic amine-initiated polyols constitute no more than 1 weight percent of the mixture of polyols.

3. The rigid polyurethane foam of claim 1 wherein the at least one polyether polyol having 6 to 8, hydroxyl groups and a hydroxyl equivalent weight of 150 to 300 and which does not contain nitrogen atoms constitutes 30 to 90 weight percent of the mixture of polyols is one or more sorbitol-initiated polyether polyols that constitute 40 to 70 weight percent of the mixture of polyols.

4. The rigid polyurethane foam of claim 3 wherein one or more polyether polyols having a hydroxyl equivalent weight of 300 to 750 and a hydroxyl functionality of 2 to 3 constitutes 5 to 35 weight percent of the mixture of polyols.

5. The rigid polyurethane foam of claim 3 wherein triethanolamine and aliphatic amine-initiated polyols different than triisopropanolamine together constitute no more than 5 weight percent of the mixture of polyols.

6. The rigid polyurethane foam of claim 3 wherein triisopropanolamine constitutes 6 to 20 weight percent of the mixture of polyols.

7. A method of making a rigid polyurethane foam of claim 1, comprising forming and curing a reaction mixture characterized by having an isocyanate index of 95 to 150 wherein the reaction mixture comprises
   A) an aromatic polyisocyanate or mixture of aromatic polyisocyanates, the aromatic polyisocyanate or mixture of aromatic polyisocyanates having an isocyanate functionality of 2 to 4 and an isocyanate equivalent weight of 80 to 175;
   B) a mixture of polyols, the mixture of polyols having an average hydroxyl equivalent weight of 125 to 225 and an average hydroxyl functionality of 3.5 to 6 hydroxyl groups per molecule, wherein triisopropanolamine constitutes 4 to 33 weight percent of the mixture of polyols, at least one polyether polyol having 6 to 8 hydroxyl groups and a hydroxyl equivalent weight of 150 to 300 and which does not contain nitrogen atoms constitutes 30 to 90 weight percent of the mixture of polyols, and the mixture of polyols contains no more than 12 weight percent of alkoxylated aromatic amine-initiated polyols;
   C) one or more blowing agents in an amount sufficient to produce a foam density of at most 42 kg/m³ and
   D) at least one urethane catalyst and
   E) at least one foam-stabilizing surfactant.

8. A method of manufacturing a multilayer thermal insulation assembly, comprising
   1) positioning an outer shell member and an inner shell member so as to define a cavity therebetween by holding the outer shell member and inner shell member in a mechanical apparatus that maintains them in a fixed position relative to each other;
   2) introducing a polyurethane-forming reaction mixture characterized by an isocyanate index of 95 to 150 into the cavity;
   3) curing the polyurethane-forming reaction mixture such that it expands and reacts to produce a polyurethane foam that fills the cavity and adheres to the outer shell member and to the inner shell member to produce the multilayer thermal insulation assembly,
   4) and then demolding the multilayer thermal insulation assembly by removing it from the mechanical apparatus, wherein the reaction system comprises the polyurethane-forming reaction mixture comprising
   A) an aromatic polyisocyanate or mixture of aromatic polyisocyanates, the aromatic polyisocyanate or mixture of aromatic polyisocyanates having an isocyanate functionality of 2 to 4 and an isocyanate equivalent weight of 80 to 175;
   B) a mixture of polyols, the mixture of polyols having an average hydroxyl equivalent weight of 125 to 225 and an average hydroxyl functionality of 3.5 to 6 hydroxyl groups per molecule, wherein triisopropanolamine constitutes 4 to 33 weight percent of the mixture of polyols, at least one polyether polyol having 6 to 8 hydroxyl groups and a hydroxyl equivalent weight of 150 to 300 and which does not contain nitrogen atoms constitutes 30 to 90 weight percent of the mixture of polyols, and the mixture of polyols contains no more than 12 weight percent of alkoxylated aromatic amine-initiated polyols;

C) one or more blowing agents in an amount sufficient to produce a foam density of at most 42 kg/m$^3$ and D) at least one urethane catalyst and E) at least one foam-stabilizing surfactant.

9. The method of claim 8 wherein step 4) is performed 2.5 to 20 minutes after step 2).

10. The method of claim 8 wherein step 4) is performed 3 to 6 minutes after step 2).

11. The method of claim 8, wherein alkoxylated aromatic amine-initiated polyols constitute no more than 1 weight percent of the mixture of polyols.

12. The method of claim 8 wherein the at a least one polyether polyol having 6 to 8 hydroxyl groups and a hydroxyl equivalent weight of 150 to 300 and which does not contain nitrogen atoms constitutes 30 to 90 weight percent of the mixture of polyols is one or more sorbitol-initiated polyether polyols that constitute to 70 weight percent of the mixture of polyols.

13. The method of claim 8 wherein one or more polyether polyols having a hydroxyl equivalent weight of 300 to 750 and a hydroxyl functionality of 2 to 3 constitutes 5 to 35 weight percent of the mixture of polyols.

14. The method of claim 8 wherein triethanolamine and aliphatic amine-initiated polyols different than triisopropanolamine together constitute no more than 5 weight percent of the mixture of polyols.

15. The method of claim 8 wherein triisopropanolamine constitutes 6 to 20 weight percent of the mixture of polyols.

* * * * *